United States Patent [19]

Cameron et al.

[11] Patent Number: 5,008,041

[45] Date of Patent: Apr. 16, 1991

[54] PREPARATION OF CONDUCTIVE POLYANILINE HAVING CONTROLLED MOLECULAR WEIGHT

[75] Inventors: Randy E. Cameron, Pacific Palisades; Sandra K. Clement, Canyon Country, both of Calif.

[73] Assignee: Lockheed Corporation, Calabasas, Calif.

[21] Appl. No.: 471,979

[22] Filed: Jan. 30, 1990

[51] Int. Cl.$^5$ ............................................... H01B 1/06
[52] U.S. Cl. .................................... 252/500; 252/518; 528/422; 525/540
[58] Field of Search ................ 528/422, 332; 252/500, 252/518; 525/540

[56] References Cited

U.S. PATENT DOCUMENTS

| | | | |
|---|---|---|---|
| 4,498,685 | 1/1989 | Yaniger | 528/422 |
| 4,806,271 | 2/1989 | Yaniger et al. | 252/518 |
| 4,822,638 | 4/1989 | Yaniger | 252/500 |
| 4,851,487 | 8/1989 | Yaniger et al. | 525/436 |
| 4,855,361 | 2/1989 | Yaniger et al. | 525/540 |

Primary Examiner—Josephine Barr

[57] ABSTRACT

Process for producing conductive polyaniline of controlled molecular weight by providing a mixture of aniline and dianiline in predetermined proportions dependent on the desired molecular weight of polyaniline to be formed. The mixture is reacted in the presence of an oxidant such as ammonium persulfate and a protonic (Bronsted) acid such as tosylic acid, to polymerize the mixture of aniline and dianiline, and forming conductive polyaniline of the desired molecular weight. Soluble conductive polyanilines having an average molecular weight not higher than about 600,000 (by gel permeation chromatography versus polystyrene in N-methyl pyrrolidone) can be obtained. Using about 6 to about 18 mols of aniline per mol of dianiline, according to one mode of procedure, conductive polyaniline having an average molecular weight ranging from about 150,000 to about 600,000 can be obtained. According to another feature of the invention, mild or weak oxidants such as o-chloranil and cupric chloride, as well as strong oxidants such as ammonium persulfate, can be used in the reaction.

14 Claims, No Drawings

PREPARATION OF CONDUCTIVE POLYANILINE HAVING CONTROLLED MOLECULAR WEIGHT

BACKGROUND OF THE INVENTION

This invention relates to the production of electrically conductive polyaniline and is particularly concerned with a process for producing conductive polyaniline having controlled molecular weight and good solubility in organic solvents.

Electrically conductive polyaniline is generally synthesized via the oxidative polymerization of aniline under aqueous acidic conditions. More specifically, in the oxidative polymerization of aniline, a strong oxidant such as ammonium persulfate is added to an aqueous HCl solution containing aniline. The strong oxidant is needed to oxidize aniline. The aniline then undergoes oxidative polymerization to form conductive polyaniline. This material can be de-protonated, if desired, in an ammonium hydroxide solution to form the non-conductive free base polyaniline.

Aniline is much more difficult to oxidize than the polyaniline oligomers. Consequently, the slow or rate-determining step of the reaction is the oxidation of aniline. This is very slow. Once an aniline molecule is oxidized, other aniline moieties attach and polymerize onto it. This polymerization reaction is highly exothermic. Because aniline quickly polymerizes off of the first aniline molecules oxidized, the molecular weight distribution of the polymer is difficult to control and can range widely. The polyaniline product of such reaction generally contains a large percentage of polymer of very high molecular weight, e.g. over 2,000,000. However, this same product also contains some material having a relatively low molecular weight, e.g. of the order of 2,000. Unfortunately, only the low molecular weight material is soluble in organic solvents. The solubility of high molecular weight conductive polyaniline in organic solvents has been increased by attaching specific derivatizing agents such an anhydrides to the polymer backbone. This has been described in U.S. Pat. No. 4,851,487 to S. I. Yaniger and Randy E. Cameron, and assigned to the same assignee as the present application. U.S. Pat. No. 4,855,361 to S. I. Yaniger and Randy E. Cameron, and assigned to the same assignee as the present application, describes the blending of such soluble conductive polymers with polyimide resins.

The utility of conductive polymers such as conductive polyaniline is optimized when the material is highly soluble in organic solvents. This solubility allows for easy blending of the polymer with other resins such as polyimides as described in above U.S. Pat. No. 4,855,361. It is well known that the solubility of a polymer is increased when its molecular weight is decreased. Consequently, the optimum conductive polyaniline for blending should have as low a molecular weight as possible while maintaining high electrical conductivity and good thermal stability. It has been found that the conductive form of polyaniline is very conductive when it is only 8 aniline units long. On the other hand, high molecular weight polyaniline is necessary for application such as for making conductive fibers. For such applications contamination by low molecular weight polyaniline decreases the strength of the fibers. Consequently each application requires a different molecular weight polyaniline. However, an easy method for controlling the molecular weight of polyaniline has heretofore not been known.

An object of the present invention is the provision of procedure for the oxidative polymerization of aniline to conductive polyaniline having controlled molecular weight.

Another object is to provide relatively simple procedure for oxidative polymerization of aniline in high yield to conductive polyaniline while controlling the molecular weight of the polyaniline to obtain relatively low molecular weight conductive polyaniline having good solubility in organic solvents, or relatively high molecular weight conductive polyaniline having good mechanical properties, e.g. for making fibers.

Still another object is to provide procedure for synthesizing low molecular weight conductive polyaniline having good solubility in organic solvents, and whose solubility can be further optimized, if desired, by de-protonating to the polyaniline emeraldine free base form and derivatizing the polyaniline with derivatizing agents such as an anhydride.

Yet another object is to provide novel procedure of the above type for oxidative polymerization of aniline to conductive aniline employing weak as well as strong oxidants and obtaining, in high yield, a product of good purity.

SUMMARY OF THE INVENTION

According to the present invention, a simple method is provided for controlling the molecular weight of conductive polyaniline which is produced during the oxidative polymerization of aniline. It has been found that dianiline can accelerate the polymerization of aniline, and that upon oxidation of dianiline in the presence of aniline, aniline molecules quickly attach and polymerize under oxidizing conditions. The term "dianiline" as employed herein is intended to denote p-dianiline which is N-phenyl-p-phenylenediamine.

Consequently, if aniline and dianiline are mixed in an acid solution in the presence of a suitable oxidant such as ammonium perisulfate, the dianiline is quickly oxidized. The aniline, which is not quickly oxidized, attaches to the dianiline. This trimer can then undergo further oxidation and additional aniline molecules will attach to the polymer backbone. In this manner, the polymer backbone can be built up. The molecular weight of the conductive polyaniline formed will be determined by the ratio of the aniline to the dianiline employed in the reaction mixture. In this manner the polymerization reaction can be controlled to obtain low molecular weight conductive polyaniline having good solubility in organic solvents, or relatively high molecular weight conductive polyaniline. Also, the process of the invention wherein dianiline is substituted for part of the aniline improves the yield and characteristics of the final product.

As an additional feature of the invention, when employing a mixture of aniline and dianiline as reactant, since the addition of dianiline to aniline bypasses the rate determining first step in the conventional polymerization reaction of reacting two aniline molecules to initiate polymerization, mild or weak oxidants, as well as strong oxidants, can be employed to induce the oxidative polymerization, which renders the polymerization process easier to control. Heretofore, when employing only aniline as the reactant, strong oxidants have been employed and the reaction was difficult to

DETAILED DESCRIPTION OF THE INVENTION AND PREFERRED EMBODIMENTS

The process of the invention for producing conductive polyaniline of controlled molecular weight comprises providing a mixture of aniline and dianiline in predetermined proportions dependent on the desired molecular weight of polyaniline to be formed, reacting such mixture in the presence of an oxidant and a protonic (Bronsted) acid to polymerize the mixture of aniline and dianiline, and forming conductive polyaniline of the desired molecular weight.

The molar proportion of aniline to dianiline in the mixture can be broadly in the range of about 1 to about 100, that is 1 to about 100 mols of aniline per mol of dianiline. In order to obtain soluble conductive polyaniline, a molar proportion of about 6 to about 18 mols of aniline per mol of dianiline is employed and the resulting conductive polyaniline will have an average molecular weight not higher than about 600,000, e.g. about 2,000 to about 600,000, particularly about 150,000 to about 600,000. All polyaniline molecular weights set forth herein are by gel permeation chromotography (GPC) versus polystyrene in N-methyl pyrrolidone (NMP). When employing about 6 mols of aniline per mole of dianiline, in the "pulse" reaction method described hereinafter and in Examples 7-10 hereof, the resulting polymer has an average molecular weight of about 160,000 and is both soluble and conductive. On increasing the proportion of aniline in the reaction mixture of aniline and dianiline the molecular weight of the resulting polymer increases. Thus, when employing a proportion of about 10 mols of aniline per mol of dianiline in the reaction mixture, a conductive polyaniline corresponding to an average molecular weight of about 400,000 is obtained. When employing a molar proportion of more than 18 mols of aniline per mol of dianiline, high molecular weight conductive polymers having an average molecular weight in excess of 600,000, and having good mechanical properties, e.g. for making fibers, can be obtained. It should be noted that use of the method of Example 5 hereof yields lower molecular weight polyanilines, but the ratio of aniline to dianiline still controls molecular weight.

It is accordingly seen that by choosing a preselected proportion of aniline to dianiline in the initial reaction mixture, a conductive polyaniline of controlled molecular weight can be obtained. Generally, the lower the molecular weight of the conductive polyaniline obtained, the greater the solubility of such polymer in organic solvents, and the greater its utility.

The present invention also has as an additional feature the control of the molecular weight of the conductive polyaniline using milder oxidizing conditions. Thus the process of the present invention has the advantage that weak oxidants, as well as strong oxidants can be employed. Thus, while strong oxidants such as ammonium persulfate can be employed to catalyze the oxidative polymerization of aniline according to the invention, mild oxidants such as benzoperoxide, or weak oxidants such as o-chloranil, p-chloranil and cupric chloride can also be successfully employed in the invention procedure to obtain conductive polyaniline of controlled molecular weight and good solubility, with superior purity of product. The use of weaker oxidants also renders the polymerization reaction easier to control. The proportion of oxidant employed in the polymerization reaction can range from about 0.5 to about 1.0 mol per mol of both the aniline and dianiline in the initial reaction mixture.

As a matter of fact, the dianiline present in the aniline-dianiline initial reaction mixture is so readily oxidized that 5% platinum on activated charcoal catalyst can also be used to induce polymerization to form soluble conductive polyaniline by the invention procedure.

A protonic acid is also employed in conjunction with the oxidant, to function as dopant for producing the conductive polyaniline product. There are two roles of the acid in the polymerization reaction. The first role is to produce a conductive polyaniline. The second is that during the synthesis, the acid is required to provide a highly ionically active solution for high purity conductive polyaniline material to be formed. Thus, an excess of a strong acid is required to provide the high acidity and high ion content required in the reaction.

Accordingly, for this purpose, protonic (Bronsted) acids are employed such as hydrochloric acid, sulfuric acid, formic acid, tosylic acid and aromatic multisulfonic acids such as benzene disulfonic acid. However, the use of tosylic acid or benzene disulfonic acid is preferred in providing both a thermally stable conductive polyaniline as well as a soluble polymer.

The proportion of protonic acid employed can range from about 2.0 to about 3.0 mols per mol of both the aniline and dianiline in the initial reaction mixture.

If desired, although not essential, a solvent such as acetic acid or formic acid can be employed to dissolve the dianiline in the initial reaction mixture.

There is no need for temperature control of the polymerization reaction according to the invention, since there is only very mild warming of the reaction mixture. This contrasts with the much higher temperatures conventionally utilized in the oxidative polymerization of aniline heretofore carried out using only aniline as the reactant, in order to initiate and effect a much more complex polymerization reaction without control of the molecular weight of the polyaniline product.

In carrying out the polymerization reaction according to the invention, dianiline is used as the initial building block for polymer chains with the subsequent stepwise addition of aniline units. With this method, the average chain length of the product may be determined by the number of aniline additions. Thus, one may easily produce either short chain, highly soluble, moderately conductive polymers or long chain, highly conductive, polymers with limited solubility, yet good mechanical properties.

Thus, according to this feature of the invention, the molecular weight of the conductive polyaniline product can be easily controlled by adding oxidant to a solution containing predetermined proportions of aniline and dianiline and a protonic acid, e.g. tosylic acid. Consequently, the molecular weight of the final material will be determined by the ratio of aniline to dianiline, as shown by the following general reaction scheme.

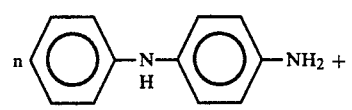

-continued

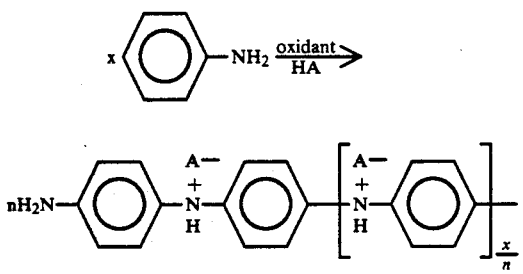

where HA is a protonic acid, n is 1, and x can range from 1 to 100.

In carrying out the reaction according to one method, all of the aniline and dianiline are in solution in predetermined proportion, with the protonic acid, and all of the oxidant is then added. This procedure is illustrated in Example 5 hereof. Alternatively, the reaction can be carried out by the "pulse" reaction method, wherein additional amounts of aniline and oxidant are periodically added to the initial reaction mixture containing dianiline, aniline and protonic acid, to provide a total predetermined proportion of aniline and dianiline, as illustrated in Examples 7-10 hereof, the molecular weight of the conductive polyaniline produced depending on the total proportion of aniline and dianiline. However, the latter method results in higher molecular weight conductive polyaniline as compared to the former method, for corresponding ratios of aniline to dianiline. After the product is washed and dried it is fairly soluble in NMP (N-methylpyrrolidone) and formic acid. The conductivity is determined after the material is ground to a fine powder and pressed into a 0.5" diameter wafer. The polyaniline yield ranges from 30-90% conversion of aniline, and is dependent on the amount of oxidant used. Bulk conductivities range from $10^{-4}$-11 S/cm depending on the specific synthetic procedure. The conventional method for polyaniline synthesis yields only 10-20% conversion of aniline to polyaniline.

The conductive polyaniline product formed by the above reaction can be deprotonated by ammonium hydroxide to form the polyaniline free base. This free base can then be derivatized, e.g. by reaction with an anhydride, as disclosed in above U.S. Pat. No.4,851,487, or by reaction with an alkylating agent, such as methyl iodide as disclosed in U.S. Pat. No. 4,798,685 to Yaniger, assigned to the same assignee as the present application, or by reaction with an aromatic multisulfonic acid such as benzene disulfonic acid as disclosed in U. S. application Ser. No. 226,484, filed Aug. 1, 1988, by Randy E. Cameron, now U.S. Pat. No. 4,935,163 and also assigned to the same assignee as the present application, all of such disclosures being incorporated herein by reference.

As previously noted, the conductive polyaniline products produced according to the invention, including the soluble polymers particularly having an average molecular weight below about 600,000, can be rendered even more soluble by converting the conductive polyaniline to the emeraldine polyaniline free base by deprotonating, e.g. with NH$_4$OH, and derivatizing such polyaniline free base with an anhydride, an alkylating agent, or a multisulfonic acid, e.g. in the manner described in the above patents 4,851,487 or 4,798,685, or U. S. application 226,484.

In addition, if desired, the soluble conductive polyaniline polymers produced according to the present invention can be blended with other resins such as polyimides and polyamides, to render such polyimides or polyamides conductive by doping with the conductive polyaniline polymers hereof, resulting in easily processible, highly thermally stable conductive polymer blends.

The following are examples of practice of the invention, it being understood that these examples are only illustrative and not limitative of the invention.

EXAMPLE 1

Between 1 and 20 parts dianiline are weighed and completely dissolved in 600 parts of a solution containing 1M of the protonic acid benzene disulfonic acid. Between 39 and 20 parts aniline are added to the solution for a total of 40 parts of aniline +dianiline. 40 equivalents of the oxidant ammonium persulfate are dissolved in 400 parts of the 1M protonic acid solution. The oxidant solution is slowly added to the solution containing the 40 parts aniline + dianiline. After the mixture is allowed to stir for about 5 minutes, it is filtered and the filtrate is thoroughly washed with high purity deionized water. The solid cake is removed and mixed thoroughly with about 500 parts acetone, then the mixture is filtered. The acetone treatment is repeated until the filtrate is clear. The final solid cake is dried thoroughly before use. The dry product is weighed, then ground to a powder and pressed into a 0.5" diameter pellet. The bulk conductivity of the pellet is measured by a four point probe. The yield calculated on the conversion of aniline to polymer is 50-70%; the conductivity ranges from 2 to 8 S/cm.

EXAMPLE 2

Two parts of dianiline are completely dissolved in 10 parts acetic acid in a reaction vessel. Then one part aniline and 20 parts of the 1M protonic acid solution of benzene disulfonic acid are added to the vessel. While the mixture is vigorously stirring, two equivalents of ammonium persulfate oxidant in 20 parts of the same 1M protonic acid solution are added to produce a trimer. Then one part aniline is added to the vigorously stirring mixture. After approximately 5 minutes one equivalent of oxidant in 10 parts of the same 1M protonic acid solution is added over a period of 5 minutes to the mixture. The mixture must be stirred for about 2 minutes before another portion of aniline can be added. In the same manner, aliquots of aniline and oxidant are added alternately until the desired product is formed. The addition of oxidant is such that it is fast enough to avoid polymer-polymer interaction, but slow enough to avoid gelling of the mixture. The aniline and oxidant should also be added in the proper sequence in order to increase the chain length and to avoid excessive oxidation of the polymer chains. After the reaction is complete, the product is treated as in Example 1 above. Yield is 40 to 60% conversion of aniline to polyaniline. The conductivity, solubility and physical characteristics of the product vary with the number of aniline/oxidant additions.

EXAMPLE 3

A 1 molar solution of hydrochloric (HCl) acid was prepared. Four mililiters of aniline was added to a flask containing 200 ml 1 M HCl. The solution was stirred for several minutes to allow the aniline to completely dissolve. Then 4 grams dianiline was ground to a fine powder and added to the mixture. The solution was stirred until all the material was dissolved. Approximately 4.6 grams of ammonium persulfate was quickly added to the solution. The mixture rapidly became a dark blue until the filtrate was colorless. The filter cake was thoroughly mixed with acetone or methanol and filtered. The solvent treatment was continued until the filtrate was colorless. After thorough drying, the resulting green material weighed 4.13 grams. This weight represents a 43% conversion of aniline to polymer. The material had a surface conductivity of 135 ohm/cm$^2$.

EXAMPLE 4

The same procedure as in Example 3 was carried out except that 6 ml of aniline and 2 grams of dianiline were used. The resulting product weighed 3.13 grams. This weight represents about 33% conversion of aniline to polymer. The dark green-black material was soluble in N-methyl pyrrolidone (NMP), formic acid, and slightly soluble in ethanol and had a surface conductivity of 95 ohms/cm$^2$.

EXAMPLE 5

Two and a half liters of 1M 4-toluene sulfonic acid (tosylic acid) solution was prepared by dissolving 475 grams of tosylic acid in a minimum amount of deionized water and diluting to 2500 ml. 86.8 grams of ammonium persulfate was dissolved in 800 ml of the 1M tosylic acid solution. 76 ml aniline and 4.0 grams of dianiline was dissolved in 1200 ml of the acid solution. The aniline, dianiline mixture was allowed to stir for 15 to 20 minutes until all the material was dissolved. The ammonium persulfate solution was quickly added to the mixture while it was stirring to prevent gel formation. The resulting material was washed with water and acetone and dried as described in Example 3. The resulting product weighed 96.23 grams which represents a 60% conversion of aniline to polymer. The material was soluble in NMP and had a bulk conductivity of 1.65 S/cm.

EXAMPLE 6

The same procedure as in Example 5 was carried out except that 140 grams of ammonium persulfate was used. The resulting product weighed 83.2 grams which represents a 52% conversion of aniline to polymer. The material was soluble in NMP and had a conductivity of 6.7 S/cm.

EXAMPLE 7

Two and a half liters of 1M tosylic acid was prepared as in Example 5 above. Dianiline was ground to a fine powder, then 9.2 grams was weighed and dissolved in 100 ml concentrated acetic acid. While the mixture stirred, 200 ml of the tosylic acid solution and 4.7 ml of aniline were added. In a separate flask 125.51 grams of ammonium persulfate oxidant was weighed and dissolved in a minimum of the 1 molar tosylic acid solution and diluted to 1100 ml total volume with the acid solution. 200 ml of the ammonium persulfate oxidant solution was added very slowly to the amine mixture and stirred for 5 minutes. Another aliquot of 4.7 ml aniline was added to the mixture. After it was stirred about 5 minutes, another aliquot of 100 ml of the ammonium persulfate oxidant solution was added. The sequential 4.7 ml aniline and 100 ml oxidant additions were repeated eight more times. A total of 1100 ml oxidant solution, and 47 ml aniline were consumed. The mixture was filtered and washed three times with deionized water until the liquid filtrate was clear and colorless. The solid product was washed with water and treated with acetone as in Example 3. The resulting polymer product was a low density green powder which weighed 60.2 grams. The weight of the product was equivalent to a 58% conversion of aniline to polymer. The product was fairly soluble in N-methyl pyrrilidone (NMP) and had a conductivity of 7 S/cm.

EXAMPLE 8

The same procedure as in Example 7 was carried out, but with a total of two additions of aniline and oxidant solution. A total of 400 ml oxidant and 14.1 ml aniline were consumed. The resulting polymer product was a brittle blue material which weighed 25.6 grams. The weight was conversion of aniline to polymer. The material was soluble in NMP and had a conductivity of 6.7 S/cm.

EXAMPLE 7

Two and a half liters of 1M tosylic acid was prepared as in Example 5 above. Dianiline was ground to a fine powder, then 9.2 grams was weighed and dissolved in 100 ml concentrated acetic acid. While the mixture stirred, 200 ml of the tosylic acid solution and 4.7 ml of aniline were added. In a separate flask 125.51 grams of ammonium persulfate oxidant was weighed and dissolved in a minimum of the 1 molar tosylic acid solution and diluted to 1100 ml total volume with the acid solution. 200 ml of the ammonium persulfate oxidant solution was added very slowly to the amine mixture and stirred for 5 minutes. Another aliquot of 4.7 ml aniline was added to the mixture. After it was stirred about 5 minutes, another aliquot of 100 ml of the ammonium persulfate oxidant solution was added. The sequential 4.7 ml aniline and 100 ml oxidant additions were repeated eight more times. A total of 1100 ml oxidant solution, and 47 ml aniline were consumed. The mixture was filtered and washed three times with deionized water until the liquid filtrate was clear and colorless. The solid product was washed with water and treated with acetone as in Example 3. The resulting polymer product was a low density green powder which weighed 60.2 grams. The weight of the product was equivalent to a 58% conversion of aniline to polymer. The product was fairly soluble in N-methyl pyrrilidone (NMP) and had a conductivity of 7 S/cm.

EXAMPLE 8

The same procedure as in Example 7 was carried out, but with a total of two additions of aniline and oxidant solution. A total of 400 ml oxidant and 14.1 ml aniline were consumed. The resulting polymer product was a brittle blue material which weighed 25.6 grams. The weight was equivalent to a 55% conversion of aniline to polymer. The product was insoluble in NMP and had a conductivity of 0.8 S/cm.

EXAMPLE 9

The same procedure as in Example 7 was carried out, but with a total of five additions of aniline and oxidant solution. A total of 700 ml oxidant and 28.2 ml aniline were consumed. The resulting polymer was a low density green material which weighed 40.8 grams. The weight was equivalent to a 54% conversion of aniline to polymer. The product was soluble in NMP and had a conductivity of 2.5 S/cm.

EXAMPLE 10

The same procedure as in Example 7 was carried out, but with a total of 17 additions of aniline and oxidant solution. In order to have enough oxidant, however, 216.8 grams of ammonium persulfate (0.95 equivalents) was dissolved in a total of 1900 ml of 1M tosylic acid solution, to give 0.114 gram per ml of oxidant solution. A total of 1900 ml oxidant solution and 84.6 ml aniline were consumed. The resulting polymer was a brittle, low density green material which weighed 112.7 grams. The weight was equivalent to a 60% conversion of aniline to polymer. The product was moderately soluble in NMP and had a conductivity of 9 S/cm.

EXAMPLE 11

4.0 g of dianiline and 4.0 ml of aniline were added to a solution of 200 ml acetic acid, 20 ml distilled water and 4.0 ml of conc. HCl. 0.2g $CuC_2$ was then added to the solution. The solution was stirred under 1 atm of $O_2$. After 24 hours the solution was filtered and washed with acetone and water. When dry this material was found to be soluble in ethanol and water and had an electrical conductivity of $10^{-3}$ S/cm.

EXAMPLE 12

25.0 g tosylic acid derivatized polyaniline produced in Example 10 was stirred in 100 ml of 1.0 M ammonium hydroxide for 6 hrs. The resulting low molecular weight free base was washed with acetone and dried at 40° C. 10 g of this polyaniline emeraldine free base was dissolved in 100 ml pyridine. 10 g of methyl tosylate was then added to the solution. This mixture was stirred for 24 hrs., at which time the solution was dripped into a 50:50 mixture of hexane:toluene. The resulting powder was found to be soluble in NMP and had an electrical conductivity of $10^{-1}$ S/cm.

From the foregoing, it is seen that the invention provides an easier and more versatile method for forming electrically conductive polyaniline by controlling the molecular weight, solubility and conductivity of the product, through the use of an initial reaction mixture of aniline and dianiline, and regulating the proportions thereof, while utilizing weak oxidants as well as strong oxidants in carrying out the oxidative polymerization.

While particular embodiments of the invention have been described for purposes of illustration, it will be understood that various changes and modifications within the spirit of the invention can be made, and the invention is not to be taken as limited except by the scope of the appended claims.

What is claimed is:

1. A process for producing conductive polyaniline which comprises
    providing a mixture of aniline and dianiline in a molar proportion of aniline to dianiline in said mixture in the range of about 1 to about 100,
    reacting said mixture in the presence of an oxidant and a protonic acid to polymerize said mixture of aniline and dianiline, and
    forming conductive polyaniline.

2. The process of claim 1, employing a molar proportion of aniline to dianiline in said range sufficient to form a soluble conductive polyaniline.

3. The process of claim 1, employing a molar proportion of about 6 to about 18 mols of aniline per mole of dianiline, and obtaining a conductive polyaniline of average molecular weight of about 200 to about 600,000.

4. The process of claim 1, employing a molar proportion of more than 18 mols of aniline per mol of dianiline, and obtaining a conductive polyaniline having an average molecular weight in excess of 600,000.

5. The process of claim 1, wherein said oxidant is a strong, mild or a weak oxidant.

6. The process of claim 1, wherein said oxidant is ammonium persulfate.

7. The process of claim 1, wherein said oxidant is selected from the group consisting of benzoperoxide o-chloranil, p-chloranil and cupric chloride.

8. The process of claim 1, wherein said protonic acid is selected from the group consisting of hydrochloric acid, sulfuric acid, formic acid, tosylic acid and benzene disulfonic acid.

9. The process of claim 6, wherein said protonic acid is selected from the group consisting of hydrochloric acid, sulfuric acid, formic acid, tosylic acid and benzene disulfonic acid.

10. The process of claim 7, wherein said protonic acid is selected from the group consisting of hydrochloric acid, sulfuric acid, formic acid, tosylic acid and benzene disulfonic acid.

11. The process of claim 1, including the additional step for increasing the solubility of said conductive polyaniline, which comprises deprotonating said conductive polyaniline to the polyaniline free base, and reacting said polyaniline free base with a compound selected from the group consisting of an anhydride, an alkylating agent and an aromatic multisulfonic acid.

12. A process for producing conductive polyaniline of controlled molecular weight which comprises
    providing a reaction mixture of aniline and dianiline in a molar proportion of about 6 to about 18 mols of aniline per mole of dianiline,
    adding as oxidant ammonium persulfate and a member selected from the group consisting of tosylic acid and benzene disulfonic acid to said mixture,
    and reacting said mixture to polymerize said mixture of aniline and dianiline, and form a conductive polyaniline soluble in organic solvents and having an average molecular weight of about 2000 to about 600,000.

13. The process of claim 12, including adding additional amounts of aniline and ammonium persulfate to the reaction mixture to provide a total predetermined proportion of aniline and dianiline, and obtaining a conductive polyaniline having a molecular weight dependent on the total proportion of aniline and dianiline employed.

14. The process of claim 13, said conductive polyaniline having an average molecular weight ranging from about 150,000 to about 600,000.

* * * * *